United States Patent

Kurtzman, II

[11] Patent Number: 6,044,376
[45] Date of Patent: Mar. 28, 2000

[54] CONTENT STREAM ANALYSIS

[75] Inventor: Stephen J. Kurtzman, II, San Jose, Calif.

[73] Assignee: IMGIS, Inc., Cupertino, Calif.

[21] Appl. No.: 08/847,778

[22] Filed: Apr. 24, 1997

[51] Int. Cl.[7] .................................................. G06F 17/30
[52] U.S. Cl. ........................ 707/102; 707/10; 707/100; 707/103; 345/327
[58] Field of Search ................................ 707/4, 10, 100, 707/102, 5, 6, 14; 345/327; 705/10; 395/226; 455/4.2

[56] References Cited

U.S. PATENT DOCUMENTS

| | | | |
|---|---|---|---|
| 5,278,980 | 1/1994 | Pedersen et al. | 707/4 |
| 5,692,132 | 11/1997 | Hogan | 395/227 |
| 5,696,965 | 12/1997 | Dedrick | 707/10 |
| 5,710,887 | 1/1998 | Chelliah et al. | 395/226 |
| 5,712,979 | 1/1998 | Graber et al. | 395/200.11 |
| 5,717,860 | 2/1998 | Graber et al. | 395/200.12 |
| 5,717,923 | 2/1998 | Dedrick | 707/102 |
| 5,721,827 | 2/1998 | Logan et al. | 395/200.47 |
| 5,724,424 | 3/1998 | Glifford | 380/24 |
| 5,727,156 | 3/1998 | Herr-Hoyman et al. | 395/200.49 |
| 5,737,619 | 4/1998 | Judson | 395/761 |
| 5,740,549 | 4/1998 | Reilly | 395/214 |
| 5,751,956 | 5/1998 | Kirsch | 395/200.33 |
| 5,757,917 | 5/1998 | Rose et al. | 380/25 |
| 5,781,904 | 7/1998 | Oren et al. | 707/100 |
| 5,794,235 | 8/1998 | Chess | 707/5 |
| 5,802,515 | 9/1998 | Adar et al. | 707/5 |
| 5,835,087 | 11/1998 | Herz et al. | 345/327 |
| 5,848,396 | 12/1998 | Gerace | 705/10 |
| 5,948,061 | 9/1999 | Merriman et al. | 709/219 |

FOREIGN PATENT DOCUMENTS

| | | | |
|---|---|---|---|
| 0 749 081 A1 | 12/1996 | European Pat. Off. | G06F 17/60 |
| WO 97/21183 | 6/1997 | WIPO | G06F 151/00 |

OTHER PUBLICATIONS

Article by Ellis Booker entitled: "Seeing a Gap, A Palo Alto Startup Will Debut Advertising Server for the Net" published by Web Week, Vol. 2, Issue 2 in Feb. 1996.

Article by Bob Metcalfe entitled: "From the Ether", Infoworld, V18 issue 3, Aug. 12, 1996.

NetGravity Announces AdServer 2.0, Oct. 14, 1996, published at http://www.netgravity.com.

Article titled "Internet access: Internet marketing revolution begins in the U.S. this Sep.": Hyper Net Offering on Dec. 1996 EDGE: work–group Computer Report, V7 N316.

Article by Youji Kohda et al. entitled: "Ubiquitous advertising on the WWW: Merging advertisement on the browser" published by Computer Networks and ISDN Systems, Vol. 28, No. 11, May 1996. pp. 1493–1499.

Declaration of Dwight Allen Merriman submitted with 37 CFR 1.131 petition during prosecution of U.S. Patent No. 5,948,061.

*Primary Examiner*—Wayne Amsbury
*Assistant Examiner*—Thuy Pardo
*Attorney, Agent, or Firm*—Fenwick & West LLP

[57] ABSTRACT

Content stream analysis is a user profiling technique that generates a user profile based on the content files selected and viewed by a user. This user profile can then used to help select an advertisement or other media presentation to be shown to the user.

10 Claims, 5 Drawing Sheets

CONTENT STREAM ANALYSIS

BACKGROUND OF THE INVENTION

1. Field of the Invention

This invention relates to a method of selecting an advertisement to be shown to a user based on the content files selected and viewed by a user. More particularly, this invention relates to determining an affinity measure between an advertisement and a set of content files.

2. Background of the Invention

Product advertisement in media such as newspaper and television have the advantage of reaching many people. At the same time, these forms of advertisement are indiscriminate and may reach many people who are not interested in the product advertised.

An advertisement is more effective when it can be targeted to a specific market that is more likely to be interested in the product advertised. For example, advertisements for fishing equipment will be more effective when placed in a fishing magazine.

On the world-wide web (WWW), advertisers can target specific markets with more discrimination than other media. The manner in which content is presented on the WWW means that advertisers can reach increasingly well-defined segments of the market. For example, a high percentage of people who access a stock quotes WWW page may be interested in a stock broker. A stock broker who places an advertisement on this WWW page mall reach a smaller group of people, but a much higher percentage of this group will be potential customers. This is in stark contrast to other media such as newspaper and television, in which the target market may only be a small percentage of the total market reached.

Other media, including emerging and developing technologies such as on-demand television, will also give advertisers similar ability to target specific markets.

To take advantage of this ability to target specific markets on the WWW, advertisers often estimate a user's interests using a variety of profiling techniques. These profiling techniques can help an advertiser to select an advertisement to present to the user. Current profiling techniques use a combination of demographic, geographic, psychographic, collaborative filtering, digital identification, and hypertext transfer protocol (HTTP) information. However, these current techniques have met only with limited success.

What is needed is a more sophisticated profiling technique for generating a more useful user profile. This more useful user profile would be valuable in selecting an advertisement to be shown to the user.

OBJECTS AND SUMMARY OF THE INVENTION

Accordingly, an object of the invention is to provide a more sophisticated profiling technique for generating a more useful user profile.

A further object of the invention is to use this user profile to help select an advertisement or other media presentation to be shown to the user.

These and other objects of the invention are achieved by using the actual content files accessed and viewed by the user. These content files may be used alone or in combination with the other elements known in the prior art to help select an advertisement or other media presentation to be shown to the user. This selection process is performed by an affinity server.

First, the affinity server receives both the content files and the available advertisements. Second, the advertisements are compactly represented as advertisement feature vectors. In one example, advertisement feature vectors are multidimensional vectors comprised of individual words mapped to their frequency of occurrence. The advertisement feature vectors may be modified by weighting the importance of each word in the context of the website corpus.

Next, a content stream including a sequence of one or more pages selected and viewed by the user and including content data is also compactly represented in a sequence of content feature vectors.

Lastly, the affinity is calculated. This is done by calculating similarity measures between each advertisement and the content stream. An affinity measure is obtained by combining the similarities. This affinity measure is then used to help select an advertisement to be shown to a user.

The method described by this invention can also be applied to user-feedback media other than the WWW, such as broadcast television or interactive television. For example, content streams can be created from the television program content, such as reflected in closed caption text, length of time viewed, and how recently the show was viewed. These content streams can then be used in the method described above to select a commercial to be shown to the viewer. The method described can also target material other than advertising, such as entertainment, education, and instructional materials.

BRIEF DESCRIPTION OF THE FIGURES

FIG. 8 shows a sample advertisement feature vector.

DETAILED DESCRIPTION

Figure 1:
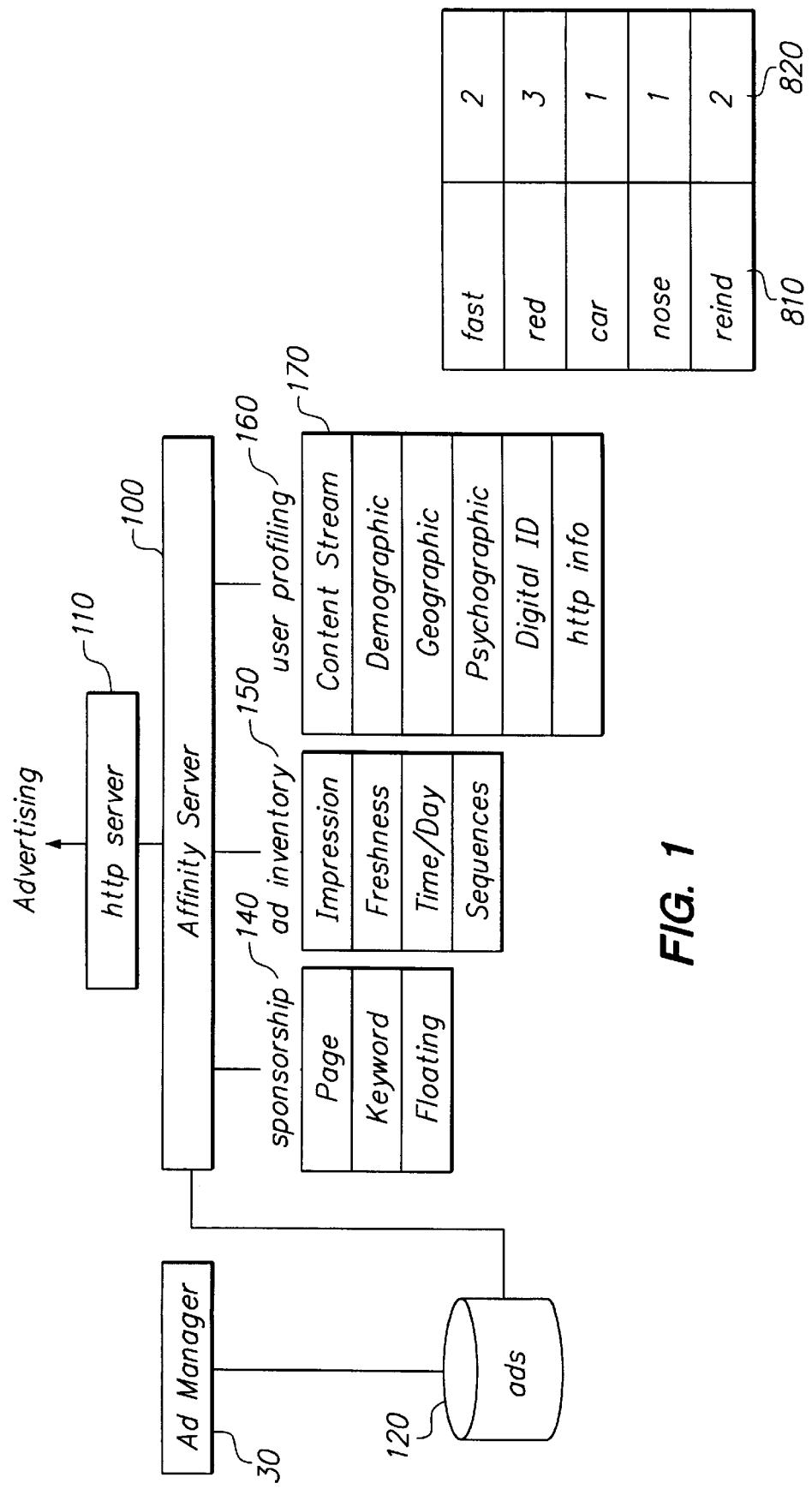
FIG. 1 shows a conceptual view of content stream analysis.

Referring to the figures, FIG. 1 is a conceptual diagram placing context stream analysis in the context of its environment. Requests for advertisements are received by the website server 110. The website server 110 sends these requests to the affinity server 100.

The affinity server 100 receives requests and selects an advertisement. The affinity server 100 has access to an advertisement bank 120. The advertisement bank 120 contains advertisements selected and controlled by the advertisement manager 130.

The affinity server 100 uses a combination of procedures to select an advertisement, including sponsorship categories 140, ad inventory 150, and user profiling 160.

Sponsorship categories 140 include page, keyword, and floating advertisements. Page sponsorship is an advertisement anchored to a location on a particular page, typically in a prominent position. Keyword sponsorship refers to showing an advertisement in response to keywords the user has entered to perform a search or other query. Floating advertisements are not anchored, and may appear anywhere on the page.

Ad inventory 150 uses impression, freshness, time/day, and sequence techniques. Impression refers to the number of times an advertisement is shown to all users. Freshness refers to the number of times an advertisement is shown to a particular user, and how soon the advertisement may be shown again and how many times the advertisement may be shown without losing effectiveness. Time/day techniques refer to selecting an advertisement based on the time and day, e.g. showing a fast food advertisement: immediately before lunch time. Sequence techniques refer to showing a sequence of advertisements which form a unified presentation, e.g. a first brand-awareness advertisement, a second product-specific advertisement, and a final where-to-buy advertisement.

User profiling 160 uses content stream analysis 170, as well as demographic, geographic, pyschographic, digital identification, and HTTP information. Content stream analysis 170 refers to the particular pages selected and viewed by the user. Demographic information refers to factors such as income, gender, age, and race. Geographic information refers to where the user lives. Psychographic information refers to user responses to a questionnaire. Digital identification information refers to user domain, browser, operating system, and hardware information. HTTP information refers to transfer protocol information.

Figure 2:
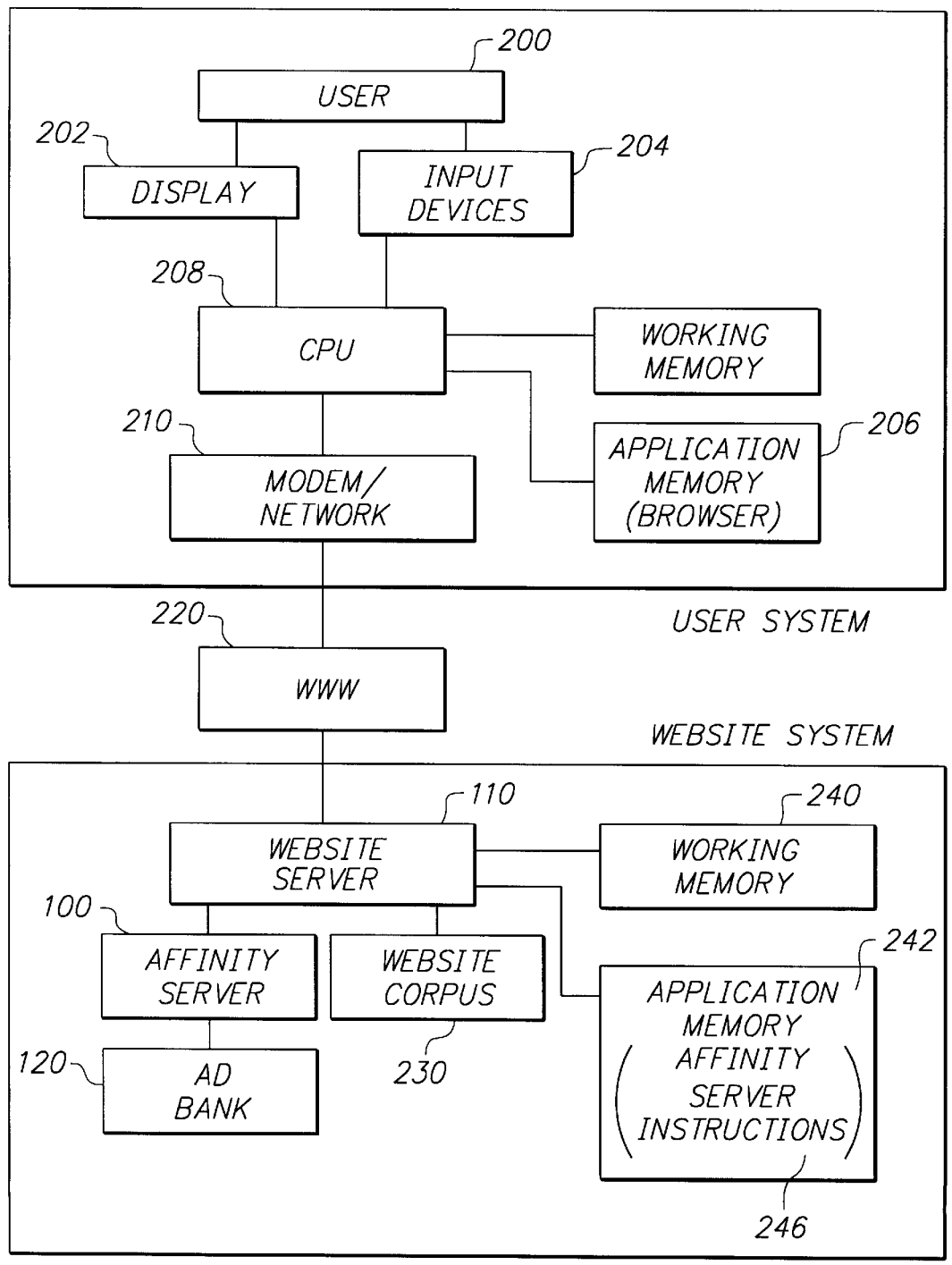
FIG. 2 shows a schematic of a user and a computer connected to a website server which contains the content stream analysis capability.

FIG. 2 shows a display 202, input devices 204, and a browser 206, all of which allow a user 200 to interact with a CPU 208. The CPU 208 is connected through a modem or network connection 210 to the WWW 220. The WWW 220 allows user 200 to send instructions through browser 206 to the website server 110.

The website server 110 controls a website corpus 230, made up of numerous website files. The website server 110 uses a working memory 240 and an application memory 242. The application memory 242 contains the instructions 246 to use the affinity server 100.

The website server 110 receives instructions from the user 200 through the WWW 220. The user 200 instructs the website server 110 to access the website corpus 230 and retrieve and transmit specific website files. These specific files selected and viewed by the user 200 are recorded by the affinity server 100. The content stream to be analyzed includes the specific files selected and viewed by the user.

Figure 3:
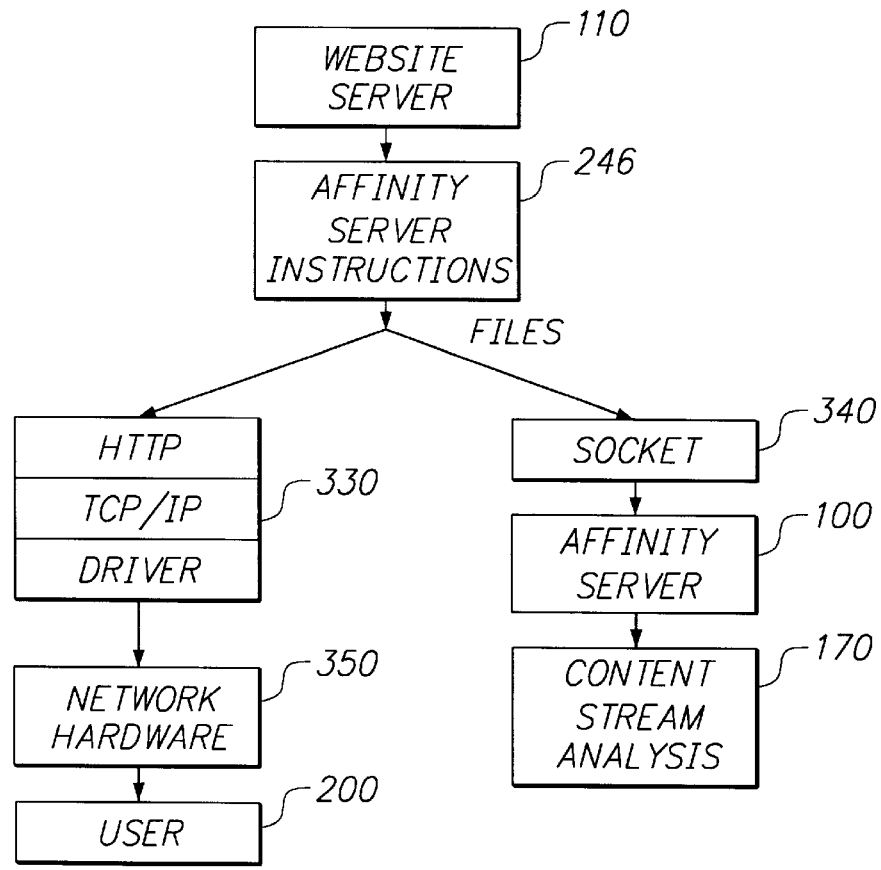
FIG. 3 shows a schematic of how the content stream is directed.

FIG. 3 shows one example of how the content stream is directed. After receiving instructions, the website server 110 uses instructions 246 to send the files 320 through the protocol stack 330 and network hardware 350 to the user 200. Preferably at the same time, the website server 110 also sends the files 320 through a socket 340 to the affinity server 100, where content stream analysis 170 is performed.

Figure 4:
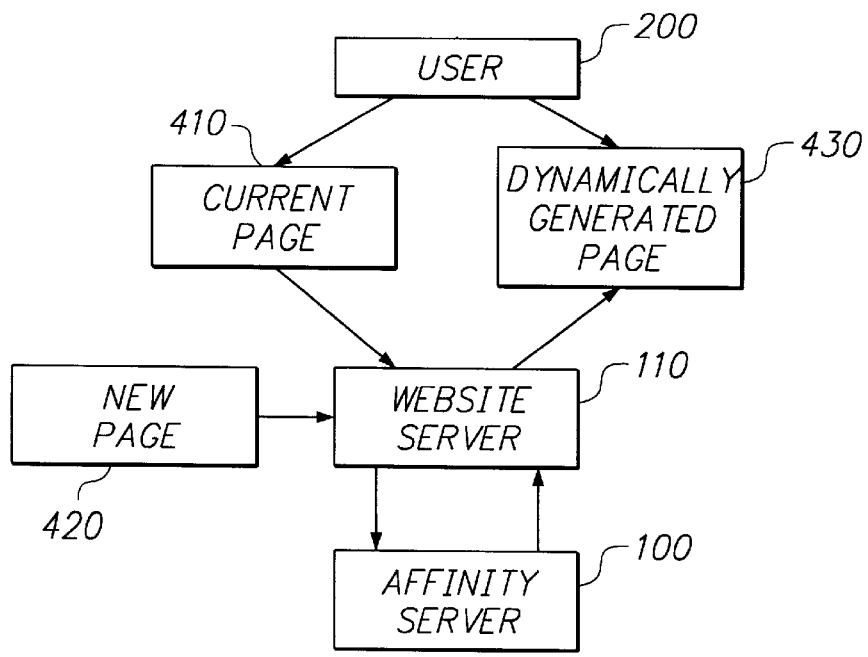
FIG. 4 shows a schematic of how content stream is performed for a dynamically generated page.

FIG. 4 shows how a page may be dynamically generated using content stream analysis. The user 200 views a current page 410, which contains links to other pages. When the user decides to follow a link leading to another page, the website server 110 retrieves the new page 420 and sends it to the affinity server 100. The affinity server 100 then selects an advertisement. This advertisement is sent back to the website server 110, where it is associated with the new page 420 and sent to the user 200, where the advertisement and the new page 420 comprises a dynamically generated page 430.

Figure 5:
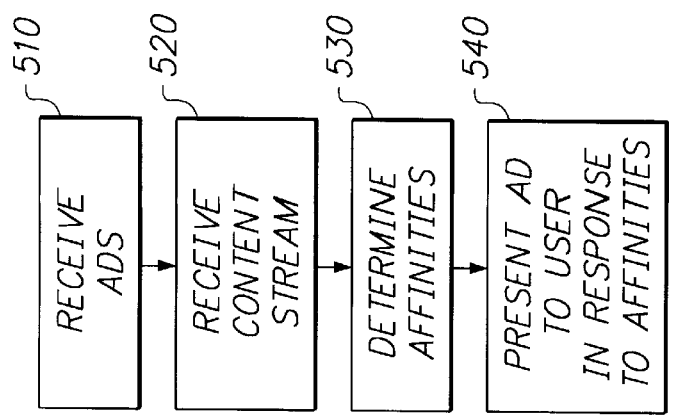
FIG. 5 shows a flowchart of content stream analysis

FIG. 5 is a flowchart of content stream analysis 170, which involves: (1) receiving a group of advertisements from an advertisement bank (block 510); (2) receiving a content stream (block 520), (3) determining an affinity measure between each advertisement and the content stream (block 530); and (4) selecting and presenting an advertisement to the user, based wholly or partially upon these affinity measures (block 540).

Figure 6:
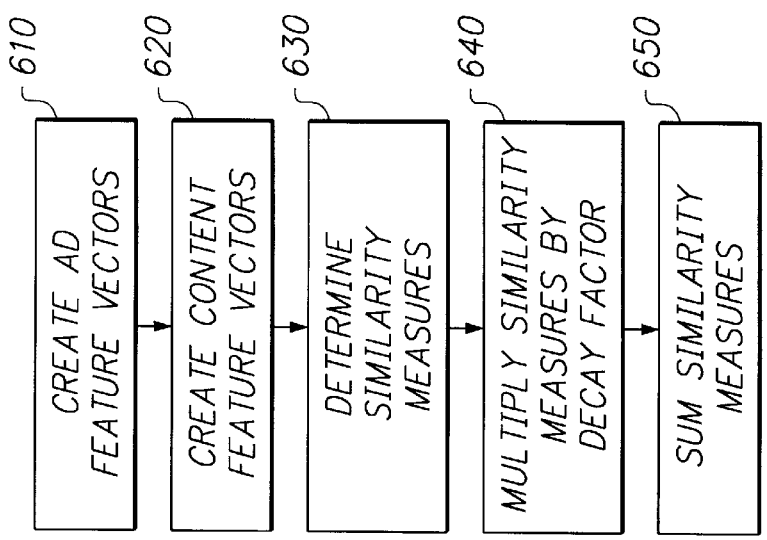
FIG. 6 shows a flowchart of determining an affinity measure.

FIG. 6 shows the determination of an affinity measure between an advertisement and a content stream (block 610). This involves: (1) creating an advertisement feature vector for each advertisement (block 620); (2) creating a content feature vector for each content file in the content stream (block 630); (3) determining a similarity measure between the advertisement feature vector and the content feature vectors (block 640); and (4) multiplying the similarity measures by a decay factor (block 66); and (5) summing the similarity measures (block 650).

Figure 7:
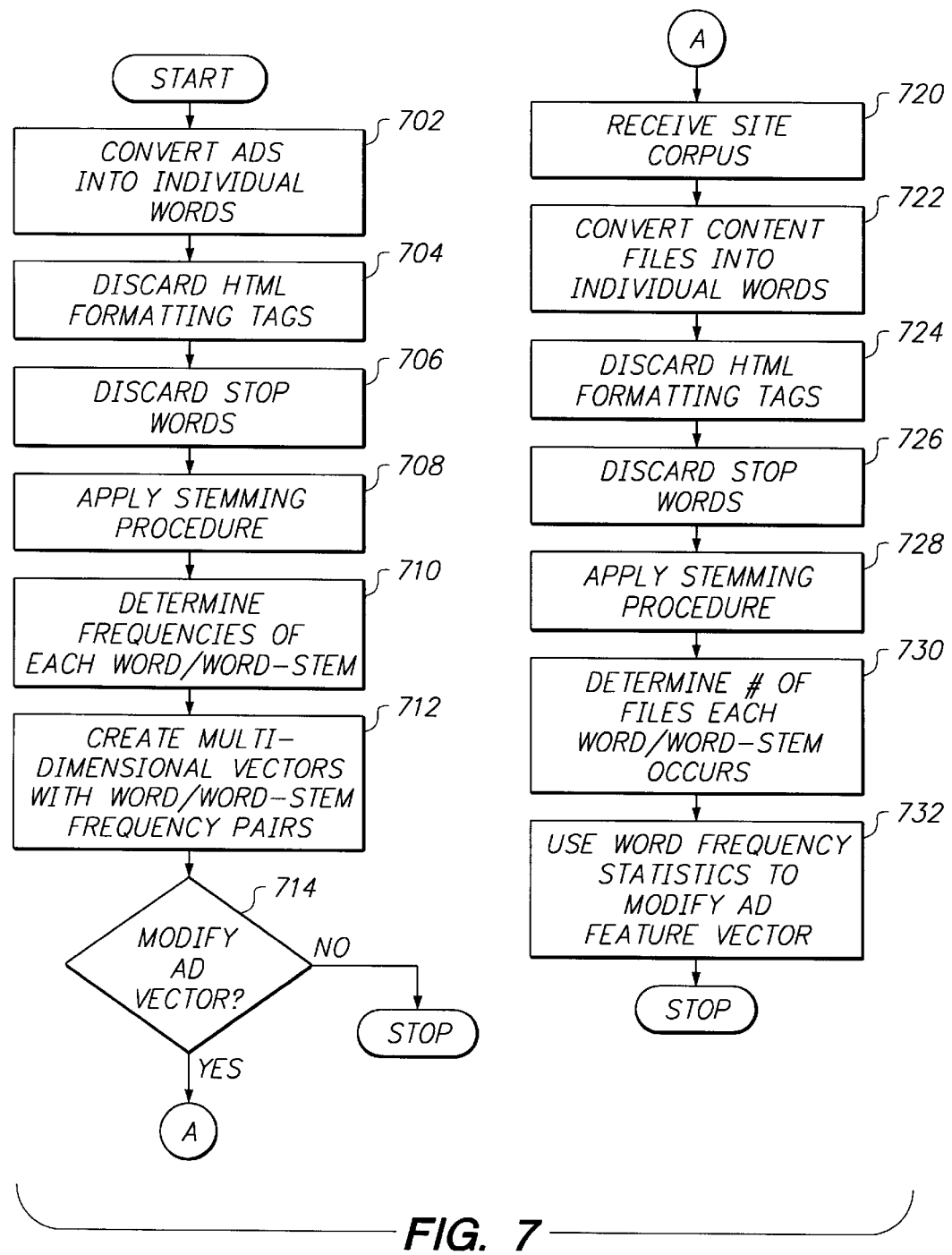
FIG. 7 shows a flowchart of creating an advertisement feature vector.

FIG. 7 shows the creation of an advertisement feature vector (block 610). First, an advertisement is converted into individual words (block 702). Text data may be parsed into their individual words, while voice data may require automated voice recognition and transcription to be converted into their individual words.

Words which are deemed insignificant for discerning the content of the advertisement are discarded. Discarded words include formatting codes, such as those which occur inside hypertext markup language (HTML) formatting tags, e.g. <title> and <bold> (block 704). The HTML standard is available at the World Wide Web Consortium website (http://www.w3.org/pub/WWW/) and is incorporated by reference. Discarded words include stop words, e.g. articles, prepositions, and common adjectives, adverbs, and verbs (block 706). Words which are deemed particularly significant may be given extra weight, e.g. words labeled by the HTML <meta keyword> or <title> tags.

Next, the individual words are passed through a stemming procedure to obtain words and word-stems (block 708). This is done to map all words with a common meaning to the same word. For example, a stemming procedure might map the words nation, national, and nationally to the stem "nati." The book "Information Retrieval" by William Frakes and Ricardo Baeza-Yates, eds., Prentice Hall, 1992, is incorporated by reference as one example of a stemming procedure.

The stemming procedure used is a modified version of the procedure found in Frakes, et al. This modified version adds new rules for inferring suffixes, and also contains a word-prefix processing scheme. The modified version recognizes when a word begins with a common prefix, and removes the prefix before the stemming process is applied. After the stemming process is complete, the prefix is added back on to the word. This improves the accuracy of the stemming process, as words that incorrectly stem to the same word under the original procedure no longer do so.

After the stemming procedure, the frequencies of each word and word-stem are determined (block 710). Finally, these frequencies are paired with the words and word-stems to create a multi-dimensional vector (block 712). This multi-dimensional vector is known as an advertisement feature vector.

The advertisement feature vector may be modified using an inverse, logarithmic, document-frequency measure derived from word frequency statistics (block 714). One embodiment of the document-frequency measure is the following:

$$\frac{n}{m} \quad \text{if } f = 0$$

$$\frac{n}{m} * \left(1 + \log\left(\frac{d}{f}\right)\right) \quad \text{for } f > 0$$

where, n is the number of occurrences of a particular word within the advertisement m is the maximum number of words in the advertisement d is the total number of files in the site corpus f is the number of files in the site corpus which contain the particular word To obtain the word frequency statistics, the site corpus received (block 720) and each individual content file in the site corpus is converted into individual words (block 722). Insignificant words such as formatting tags (block 724) and stop words (block 726) are discarded. The individual words are then passed through a stemming procedure to obtain words and word-stems (block 728). The number of files in which each word/word-stem occurs is determined, producing the word frequency statistics (block 730). These word frequency statistics are then used to modify the advertisement feature vector (block 732).

FIG. 8 shows a sample advertisement feature vector. The word/word-stems 810 are mapped to their corresponding frequency values 820.

Figure 9:
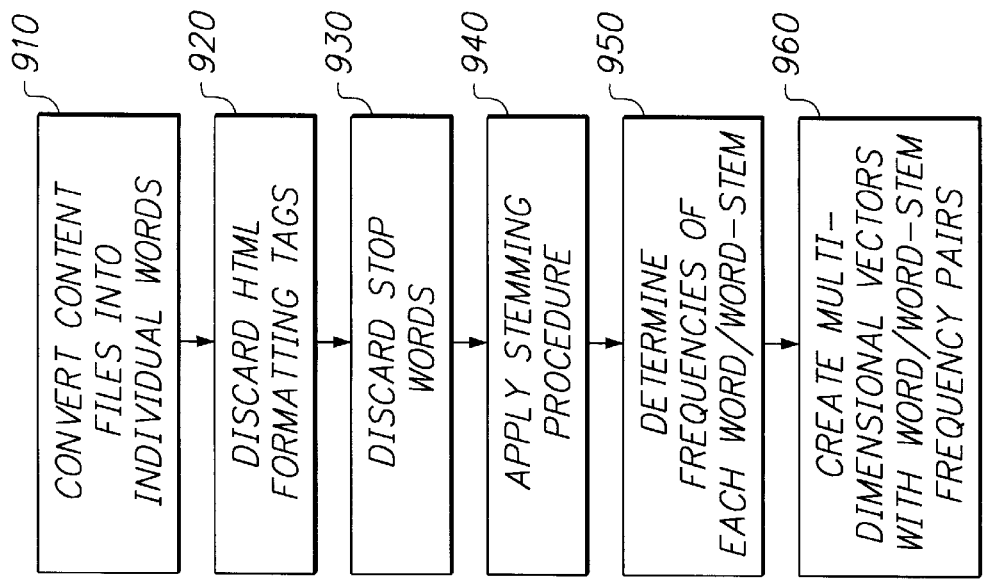
FIG. 9 shows a flowchart of creating a content feature vector.

FIG. 9 shows the creation of content feature vectors from the content files in the content stream (block 620). Each content file in the content stream is converted into individual words (block 910). Insignificant words such as HTML formatting tags (block 920) and stop words (block 930) are discarded. The individual words are then passed through a stemming procedure to obtain words and word-stems (block 940). The word and word-stems are counted to determine their frequencies (block 950). These frequencies are paired with the words and word-stems to create a multi-dimensional vector for each content file in the content stream (block 960).

The similarity measure is the dot vector product of an advertisement feature vector and a content feature vector. Mathematically, let $A=(v_o, v_1, K, v_n)$ represent the content stream, where $v_o$ represents the most recent content feature vector in the content stream and $v_n$ represents the oldest content feature vector in the content stream. Let w be an advertisement feature vector. The similarity measure of v to w is denoted Sim(v, w). The affinity measure of A to w is denoted Aff (A, w) and is calculated by:

$$\text{Aff}(A, w) = \sum_{i=0}^{n} \alpha^i \text{Sim}(v_i, w)$$

where α is the decay factor, for example $$\frac{1}{\sqrt{2}}.$$

Although the methods here have been described using WWW files as an example, they could just as easily be applied to television programs and other forms of user-feedback media. With the advent and development of interactive television and automated voice recognition and transcription systems, the methods described here could be easily applied to television programs and help determine what kind of commercials will be shown to the user.

What is claimed is:

1. A method of selecting an advertisement from a file of advertisements having a target consumer, comprising the steps of:

receiving content data representing content having particular characteristics;

receiving advertisement data representing advertisements in the file;

creating a content data structure which indicates features of the content having particular characteristics;

creating an advertisement data structure which indicates features of the advertisements in the file;

determining similarity measures between the content data structure and the advertisement data structure by calculating dot vector products between the content data structure and the advertisement data structure and multiplying the dot vector products by a decay factor;

determining affinity measures between the content data and the advertisement data in response to the similarity measures; and presenting to the consumer an advertisement from the file in response to the affinity measures.

2. The method of claim 1, wherein content data includes WWW files.

3. The method of claim 1, wherein content data includes television programs.

4. The method of claim 1, wherein creating a content data structure which indicates features of the content having particular characteristics comprises the steps of:

converting the content data into individual words;

applying a stemming procedure to the individual words to obtain words and word-stems;

determining frequencies of particular words and word-stems; and creating a multi-dimensional vector comprised of the words and word-stems mapped to their respective frequencies.

5. The method of claim 4, further comprising the steps of:

discarding stop words; and discarding words which occur inside HTML formatting tags, except for those which occur inside a meta keyword tag.

6. The method of claim 1, wherein creating an advertisement data structure which indicates features of the advertisements in the file comprises the steps of:

converting the advertisement data into individual words;

applying a stemming procedure to the individual words to obtain words and word-stems;

determining frequencies of particular words and word-stems; and creating a multi-dimensional vector comprised of the words and word-stems mapped to their respective frequencies.

7. The method of claim 6, further comprising the steps of:

discarding stop words;

discarding words which occur inside HTML formatting tags, except for those which occur inside a meta keyword tag.

8. The method of claim 6, further comprising the steps of:

determining word frequency statistics for a content available at a site;

modifying the advertisement data structure using an inverse, logarithmic, document-frequency measure derived from the word frequency statistics.

9. The method of claim 8, wherein determining word frequency statistics for the site corpus comprises the steps of:

converting the content available at a site into individual words;

applying a stemming procedure to the individual words to obtain words and word-stems; and determining frequencies of particular words and word-stems.

10. The method of claim 1, wherein presenting to the user an advertisement from the file in response to the affinity measures comprises the steps of:

retrieving the advertisement;

retrieving a content page;

combining the advertisement and the content page;

transmitting the advertisement and the content page to the user.

\* \* \* \* \*